United States Patent [19]

Keigley

[11] 4,189,966
[45] Feb. 26, 1980

[54] HYDRAULIC HAND TOOL

[76] Inventor: Ronald E. Keigley, P.O. Box 86, Salem, W. Va. 26436

[21] Appl. No.: 897,352

[22] Filed: Apr. 18, 1978

[51] Int. Cl.² .......................... B26D 1/30; B26D 5/12
[52] U.S. Cl. ........................................ 83/178; 83/554; 83/607; 83/617; 83/639; 83/642
[58] Field of Search ................. 83/554, 185, 178, 179, 83/54, 597, 607, 639

[56] References Cited
U.S. PATENT DOCUMENTS

| | | | |
|---|---|---|---|
| 1,588,200 | 6/1926 | Skelton | 83/178 |
| 2,783,840 | 3/1957 | Snorek | 83/178 |
| 3,140,634 | 7/1964 | McDaniel, Jr. | 83/554 |
| 3,587,372 | 6/1971 | Prew | 83/554 X |
| 3,788,173 | 1/1974 | Keigley | 83/554 |
| 4,088,048 | 5/1978 | Olsson | 83/554 X |

*Primary Examiner*—Frank T. Yost

*Attorney, Agent, or Firm*—Buell, Blenko & Ziesenheim

[57] ABSTRACT

The specification discloses a hydraulic pressure operated hand tool of the type in which the manual pressure exerted on a small-area pump piston creates a hydraulic pressure which is communicated to a power cylinder for activating a hand tool jaw member, such as a cutter blade. Preliminary take-up movement of the cutter blade into contact with the object to be severed, such as cables, pipe etc., is effected by manual pressure applied to a second pump piston of relatively large area, which causes rapid displacement of the hydraulic medium from a reservoir to the power cylinder before exertion of manual pressure to the small-area pump piston. A release valve provides instant return displacement of hydraulic medium via a by-pass communication from the cylinder to the reservoir to relieve the activating pressure on the cutter blade and restore it promptly to normal position. Interchangeable cutters are provided.

14 Claims, 4 Drawing Figures

HYDRAULIC HAND TOOL

This invention relates to a hydraulic pressure operated hand tool wherein the exertion of manual pressure on a pump piston communicates an amplified force via a hydraulic medium to a power cylinder for activating a jaw member, such as a cutter blade.

Hand tools, in the form of pliers, presses, or cutters, utilizing a hydraulic medium for force amplification have long been known, as represented typically in U.S. Pat. No. 343,780, issued June 15, 1886; U.S. Pat. No. 2,096,574, issued Oct. 19, 1937; U.S. Pat. No. 2,979,032, issued Apr. 11, 1961. In the U.S. Pat. No. 2,979,032, a pair of cutter blades are arranged tong-like for activation by opposing pistons on which hydraulic pressure is built-up by manually effected oscillatory movement of a pump piston. Pressure on the opposing pistons may be relieved via a relief valve in by-pass of the pump piston.

In a more recent patent, U.S. Pat. No. 3,058,214, issued Oct. 16, 1962, a hydraulically operable hand tool utilizes a pivoted jaw member, such as a cutter blade, in cooperation with a stationary plate or jaw member. A pivoted handle is arranged, in cooperation with the cutter blade, to first mechanically move the cutter blade into contact with the object to be severed, and then exert pressure on a pump piston to transmit hydraulic pressure to a power cylinder for high-pressure activation of the cutter blade. Instant relief of activation pressure may be effected via a manually operated by-pass check valve.

Finally, applicant's earlier U.S. Pat. No. 3,788,173 issued Jan. 29, 1974, provides a cutter which has some elements of similarity to the present invention but is bulkier and has limited cutting ability limited by the type of jaw there provided.

The hand operated tools described in the foregoing patents, other than applicant's earlier patent, are of the one-hand type with limited capacity and unsuited, for example to sever large diameter multi-strand copper cable. In order to provide a hydraulic hand tool of adequate capacity and which avoids other disadvantages of the devices in the foregoing patents, I have provided a hydraulic hand tool in which the force exerted on a pivoted lever, carrying a jaw member in the form of a cutter blade, is constant and in which the cutter blades can be interchanged for different kinds of materials to be cut.

More specifically, I have provided a pivoted lever, on which a jaw member in the form of a cutter blade is removably attached, which lever remote from the cutter blade is engaged by the distal end of the piston rod in a pivotable power cylinder so as to provide a constant moment arm against which the power cylinder exerts a pivoting force on the lever with increasing displacement of the power cylinder toward its final position.

I further provide a hand tool having a manually operable pump piston of relatively large area and a manually operable pump piston of relatively small area, the former for effecting rapid large volume displacement of hydraulic medium to the power cylinder actuating the cutter blade lever to cause rapid take-up movement to effect contact with the object to be severed and the latter for developing high hydraulic pressure by which the power cylinder activates the cutter blade.

Finally, I provide interchangeable blades so that the cutter can be used for a great variety of materials such as cable, sheet stock, etc.

The above features and other features are hereinafter more specifically described in connection with the accompanying drawings wherein.

Figure 1:
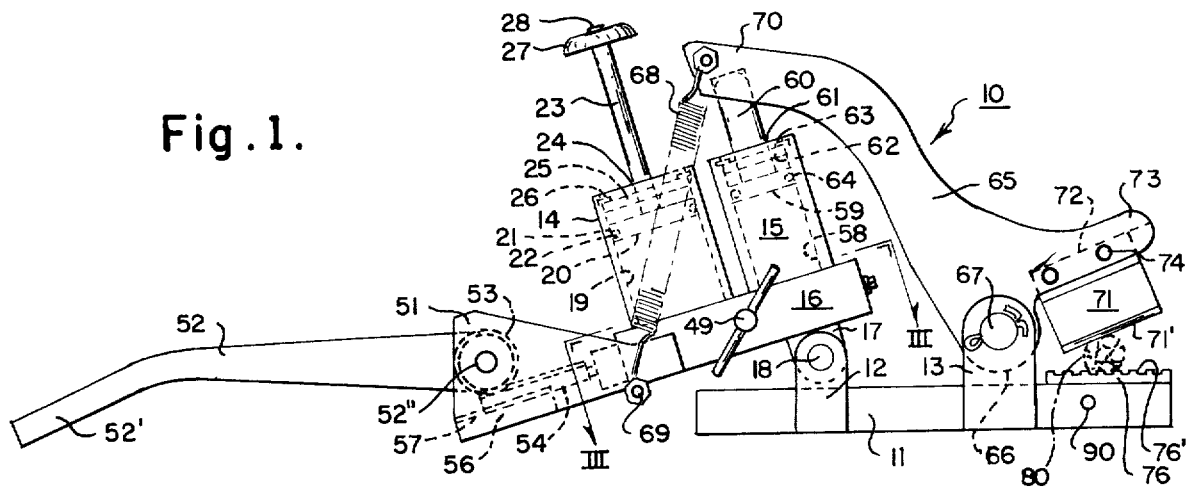
FIG. 1 is an elevational view of a preferred embodiment of a hydraulic hand tool embodying my invention.

Referring to the drawings, the preferred embodiment of hydraulic hand tool 10 shown, comprises a metal base 11. Affixed to the upper surface of the base 11 in longitudinally spaced relation, are two pairs of vertical trunnions 12 and 13.

Figure 2:
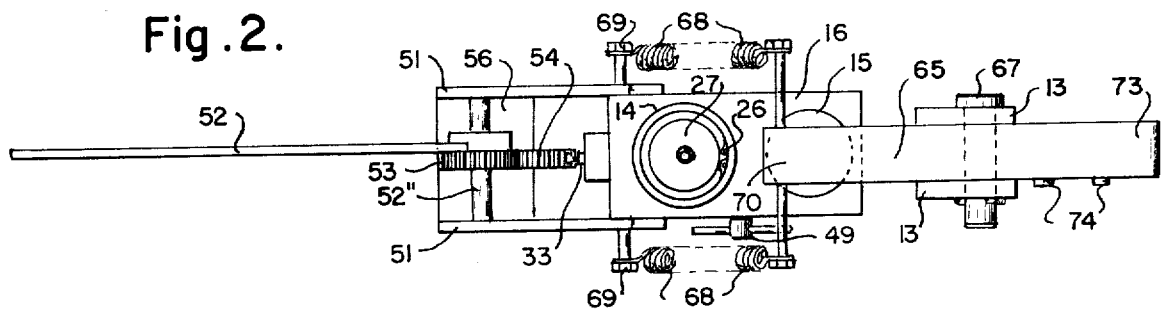
FIG. 2 is a top plan view of the embodiment of FIG. 1.
Figure 3:
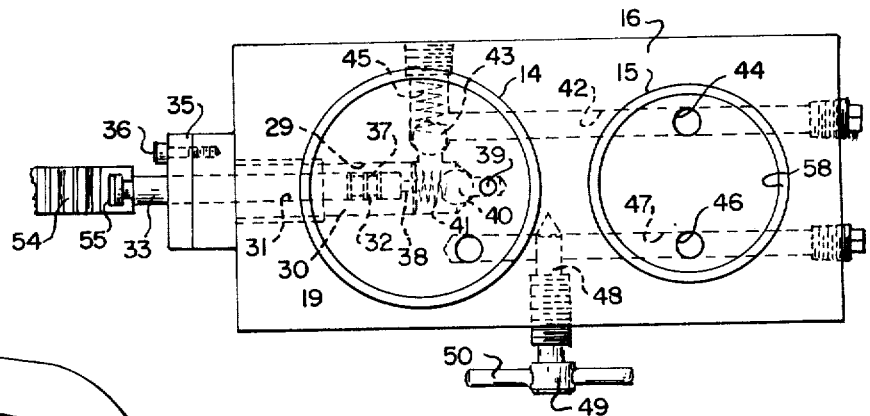
FIG. 3 is a sectional view, taken on the line III—III of FIG. 1.

As shown in detail in FIGS. 1, 2 and 3, a pressure cylinder 14 and a power cylinder 15 are mounted in side-by-side relation on a rectangular carrier portion 16 having depending lugs 17 on the bottom thereof for attaching the carrier 16 to the base by a pivot pin 18 extending through openings in lugs 17 and trunnions 12. Formed integrally with or welded to the carrier portion 16 is the cylinder portion 14 having a bore 19, which serves as a reservoir for hydraulic fluid, in which a piston 20 operates. Piston 20 is a metal disc closely conforming in diameter to that of the bore 19 and having a circumferential groove 21 carrying an O-ring or grommet 22 forming a seal with the wall of the cylinder portion 16.

Piston 20 has an operating stem 23 secured coaxially thereto which extends upwardly through a central hole 24 in an end cover 25 fitted into the upper end of the cylinder 14 and held by snap ring 26. A knob 27 is attached, as by cap screw 28, to the upper end of stem 23 for convenient manual operation of the piston 20, as more fully described thereafter.

In the carrier portion 16, a longitudinally extending bore 29 is provided into which a small diameter tube 30 constituting a pump cylinder is secured as by a screw-threaded connection. Tube 30 has an internal longitudinal bore 31 therein in which operates a pump plunger comprising a small-area piston 32 and a coaxial stem 33. Stem 33 extends outwardly through a central hole 34 in an end collar 35, fastened on the outer end of the tube 30 by cap screws 36. Piston 32 comprises a metal disc closely conforming in diameter to the bore 31 in tube 30 and having a peripheral groove containing a seal in the form of an O-ring or grommet 37.

The bore 31 in tube 30 communicates via an orifice 38 at the inner end of the tube 30 with the inner end of bore 29. The inner end of bore 29 communicates through a passage 39, containing a check valve 40, with the bottom surface of the bore 19 in the cylinder portion 14. Check valve 40 is illustratively shown as of a ball type and seated by a coil spring 41 in the direction of the bore 19 in the cylinder portion 14.

The inner end of bore 29 also communicates by way of a passage 42, containing a check valve 43, with a port 44 opening at the right-hand end face of the carrier portion 16. The check valve 43 is illustratively shown in FIG. 3 as of a ball type and biased into seated position toward the bore 29 by a spring 45.

There is further provided in the right-hand end face of the carrier portion 16 a port 46 (FIG. 3) which communicates through a passage 47 with the bottom of bore 19 of the cylinder portion 14. Intersecting the passage 47 is a bore 48 containing a shut-off valve 49. Shut-off valve 49 is preferably a needle valve operated by handle 50 from a position in which one end of the valve blocks communication through the passage 47 to an outer position to open communication through the passage 47 by rotating handle 50.

Attached to the end of the carrier portion 16 adjacent the outer end of the stem 33 of the plunger is a pair of support arms 51 (FIGS. 1 and 2) for a handle 52. Handle 52 is pivoted between the arms 51, as by pin 52", in alignment with the plunger stem 33. Handle 52 has a pinion gear 53 which engages a rack 54 having a T-slot 55 in which the outer end of the plunger stem 33 seats. The rack 54 slides in groove 57 in guide plate 56 fixed on arms 51 beneath pinion 53. When pressure is exerted downwardly on the free end 52' of the handle 52, as by the palm of the hand, a corresponding force is exerted inwardly on the plunger stem 33 by counter-clockwise rotation of pinion 53 and rightward movement of rack 54, view FIG. 2.

The power cylinder 15 is attached, as by welding, to carrier portion 16 adjacent pressure cylinder 14 and communicates with ports 44 and 46. Cylinder 15 has a bore 58 in which operates a piston 59 having a stem 60 which projects slidably through a hole 61 in the end cover 62. End cover 62 is attached by a snap ring 63 into the outer end of the bore 58 in cylinder 15. Piston 59 has a peripheral O-ring or grommet 64 which seals on the cylinder wall.

Pivotally mounted on trunnions 31, attached to the base 11, is a bell crank shaped lever 65, the plane of movement of the lever registering with the stem 62 of cylinder 15. Lever 65 has a central clevis portion 66 which lies between trunnions 13 and pivots on pin 67 extending through the trunnions.

A coil tension spring 68, connected at one end to the lever 65 and anchored at the other end to a lug 69 on the carrier portion 16, biases the lever pivotally in a counterclockwise direction to effect engagement of end surface 70, on the lever, with the end of the piston stem 60 of cylinder 15.

A jaw member, such as a cutter blade 71, of generally T-shaped cross-section (FIG. 1), is removably attached to the opposite end of the lever 65. The upper end of the cutter blade 71 is tapered and slides end-wise into a dove-tail slot 72 in the lower end 73 of the lever 65 and is secured therein by a plurality of set screws 74 engaging tapped bores 75.

With the surface on lever 65 engaging the end of the piston stem 60 while in its fully retracted position as shown in FIG. 1, the inclination of the cutting edge of the cutter blade 71 is such that on full extension of the piston stem 60, the cutting edge 71' meets the serrated or knurled face 76' of a jaw member, in the form of a plate 76 secured in the base 11, in parallel coinciding relation.

The surface 70 on the lever 65 is of such contour that the end of the piston stem 60 remains in contact with the lever 65 as the piston stem 60 moves linearly outward with increasing hydraulic pressure exerted on the piston 59.

In operation, let it be assumed that the object to be severed such as a multi-strand cable 80, is inserted between the cutter blade 71 and the plate 76 as in the position indicated by broken lines in FIG. 1.

To first effect engagement of the edge of the cutter blade with the cable 80, the operator presses manually on the knob 27 of stem 23, as with the palm of the hand. As the piston 20 presses downwardly on the hydraulic medium, such as oil, in the pressure chamber within bore 19, oil is displaced rapidly and in substantial volume (due to the relatively larger area of piston 20) through passage 39, past check valve 40, through bore 42, passage 44, and past check valve 43 into the pressure chamber within bore 58 of cylinder 15. In consequence of the displacement of oil as just described, piston 59 of cylinder 15 shifts outwardly thereby exerting a turning or pivoting movement of lever 65 sufficient to effect engagement of cutter blade 71 with the cable 80.

Once the blade 71 contacts the cable 80, the operator may now depress the end portion 52' of handle 52 downwardly to exert a force on plunger stem 33. In consequence, the relatively small area piston 32 of the plunger exerts pressure on the oil now in the system to develop the desired amplified high pressure on piston 59 of cylinder 15.

With the increased hydraulic pressure on piston 59, the piston stem 60 moves progressively outward. With increased outward movement of piston stem 60, the turning moment arm on the lever 65 progressively increases, and with full travel of piston 59, the cutting edge 71' of blade 71 will have met the plate 76, thereby completing the severance of the cable.

In order to effect rapid withdrawal of the blade 70 from the cable the operator now turns handle 50 on valve 49. Such action shifts the valve 49 to open a pressure release communication directly from the pressure chamber of cylinder 15 through passage 47 to the oil reservoir or cylinder bore 19. The force of tension spring 68, exerted via the lever 65, on the piston stem 60 restores the piston 59 downwardly to thereby displace the oil rapidly back to the reservoir 19. As soon as the cutter blade is restored to its normal position, the operator may turn handle 50 to close valve 49, in consequence of which the passage 47 is closed and the apparatus is in its normal position to start another cut.

Figure 4:
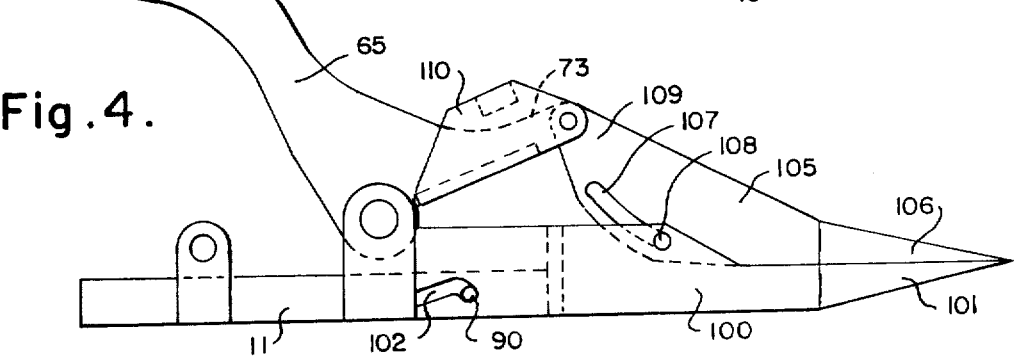
FIG. 4 is a fragmental side elevational view, showing an interchangeable blade arrangement for slitting tubing, etc.

In FIG. 4, I have illustrated a modification of the invention incorporating an interchangeable blade arrangement for internal cutting or slitting. In this arrangement the blade 71 is removed from end 73 of lever arm 65 and a slitter head is attached to base 11 and end 73 of the lever arm as hereafter described. The slitter head is made up of a lower blade 100 having an upwardly sloping cutting edge 101 at one end and an attaching slot 102 at the other end adapted to slide over and engage pin 90 on base 11. An upper blade 105 of generally bell crank shape has a generally pointed cutting end 106 lying above and adjacent cutting edge 101 of the lower blade. The upper blade 105 has a curved slot 107 following the curve of the bell crank shape which rides on pin 108 in the lower blade 100. The end 109 of the upper blade 105 remote from cutting end 106 is pivoted on one end of adapter head 110 which is in turn slidable on the end 73 of lever arm 65.

In operation, the lever arm 65 is actuated as described above in connection with FIG. 1 causing end 73 of lever arm 65 to move downwardly toward base 11. This in turn moves the end 109 of blade downwardly causing it to move on pin 108 along slot 107, in turn causing cutting blade end 106 to separate from cutting edge 101 of the lower blade and thus to perform the internal cutting or slitting operation.

While a preferred embodiment of the invention has been shown and described, it will be apparent that variations in structure and use may be made within the terms of the following claims. Thus, for example, it will be apparent that various forms of jaw members may be employed in lieu of the cutter blade 70 and plate 74, for purposes of pressing or gripping.

I claim:

1. A hand tool comprising a base, means on the base interchangeably receiving one of inside and outside cutter members, a cutter member interchangeable on said means, a lever pivoted on said base and having means receiving interchangeably said inside and outside cutter members, resilient means biasing said lever to a normal position in which said outside cutter members are separated and said inside cutter members are joined; pressure responsive means for pivotally moving said lever to effect the cooperative relation of said cutter members; a hydraulic pressure system having a reservoir, a pump having a piston of relatively small area and conduit means communicating hydraulic pressure created by operation of said pump to said pressure responsive means, a second pump having a piston of relatively large area side by side with said pressure responsive means, operative to rapidly displace a relatively large volume of hydraulic medium from said reservoir to said pressure responsive means to effect the initial movement of said lever whereby cutting contact of said cutting members with the object to be cut is effected, and carrier means pivoted on said base carrying said pumps and pistons and said pressure responsive means for unitary pivotal movement on said base whereby said pressure responsive means rotates on the base to follow the lever.

2. A hand tool according to claim 1, wherein the piston of said second pump has a stem having means thereon by which to apply pressure manually to said pump piston.

3. A hand tool according to claim 1, wherein the piston of said second pump is arranged to exert pressure directly on the hydraulic medium in said reservoir.

4. A hand tool according to claim 1, wherein conduit means provides communication between said reservoir and said pressure responsive means, and check valve means in said conduit means serves to prevent back flow of hydraulic medium to said reservoir upon operation of the first said pump.

5. A hand tool according to claim 1, wherein conduit means provides communication between said reservoir and said pressure responsive means, and a pair of check valves is interposed therein, one of which serves to prevent back flow of hydraulic medium from said pressure responsive means to the first said pump piston and the second said pump piston, and the other of which serves to prevent back flow to said reservoir on operation of the first said pump piston.

6. A hand tool according to claim 1, wherein a conduit means provides a pressure release communication directly from said pressure responsive means back to said reservoir for rapid return displacement of hydraulic medium thereto and normally closed valve means in said conduit means is operative to open communication therethrough.

7. A hand tool according to claim 1, wherein conduit means provides communication between said reservoir and said pressure responsive means, check valve means in said conduit means serves to prevent back flow of hydraulic medium from said pressure responsive means to said reservoir, a second conduit means provides pressure release communication directly from said pressure responsive means back to said reservoir in by-pass of the firsrt said conduit means for rapid return displacement of hydraulic medium thereto; and normally closed valve means in the said second conduit means is operative to open communication therethrough.

8. A hand tool according to claim 1, wherein said pressure responsive means comprises a power cylinder fixed to said carrier means and having a piston the stem of which projects coaxially into contact with said lever, linear projection of said piston stem while in contact with said cam surface effecting automatically a progressive increase in the moment arm effectively to rock said lever.

9. A hand tool according to claim 1, wherein the interchangeable outside cutter includes a jaw member on said base in the form of a flat plate member and a jaw member on said lever in the form of a cutter blade member removably held in said lever, the cutting edge of said blade member being operative to enter cooperative seated engagement with the said flat plate member to effect full severance of an object interposed therebetween.

10. A hand tool according to claim 9, wherein the said blade member is of generally T-shaped cross-section, the said lever has a dovetail slot, and the upper portion of the said blade member is tapered to interlock in said dovetail slot in said lever.

11. A hand tool according to claim 10, wherein said lever is provided with tapped bores intersecting the dovetail slot therein, and screws are provided in said tapped bores to engage said blade member to press it into frictionally locked engagement in said dovetail slot.

12. A hand tool according to claim 1, wherein the interchangeable inside cutter includes a first blade member removably engaging said base and a second blade member pivoted intermediate its length intermediate the first blade member and articulated connecting means between the second blade member and the lever whereby power movement of the lever causes the second blade to pivot relative to the first blade to separate the ends of said blades.

13. A hand tool according to claim 12 wherein the second blade has a generally bell crank shape and the pivot with the first blade is a curved slot generally following the bell crank shape along a pivot pin in the first blade.

14. A hand tool according to claim 12 wherein the two blades form together in closed position a generally isosceles triangle.

* * * * *